United States Patent [19]

Bodurtha, Jr. et al.

[11] Patent Number: 4,474,052
[45] Date of Patent: Oct. 2, 1984

[54] LABORATORY BARRICADE

[75] Inventors: Frank T. Bodurtha, Jr., Newark, Del.; Cristobal Bonifaz, Chadds Ford, Pa.

[73] Assignee: E. I. Du Pont de Nemours and Company, Wilmington, Del.

[21] Appl. No.: 449,546

[22] Filed: Dec. 13, 1982

[51] Int. Cl.³ .................................. G01N 33/22
[52] U.S. Cl. ............................................. 73/35
[58] Field of Search ............... 73/35; 220/3; 181/198

[56] References Cited

U.S. PATENT DOCUMENTS

| | | | |
|---|---|---|---|
| 2,940,300 | 6/1960 | Loving, Jr. | 73/35 |
| 3,165,916 | 1/1965 | Loving, Jr. | 73/35 |
| 3,268,107 | 8/1966 | Sperling | 73/35 X |

OTHER PUBLICATIONS

Penninger et al., Chem. Eng. Prog. 76, pp. 65–71 (1980).
Weibull, Ann. N.Y. Acad. Sci. 152, pp. 357–361 (1968).
Bodurtha, *Industrial Explosion Prevention and Protection*, Ch 5, McGraw Hill, N.Y., New York 1980.

Primary Examiner—James J. Gill
Attorney, Agent, or Firm—Scott G. Hallquist

[57] ABSTRACT

An improved laboratory barricade for containment of potentially explosive materials and processes, having a containment chamber provided with a pressure venting port or ports, wherein the improvement comprises said barricade having dimensions such that ratio of total contained volume to total area of the pressure venting port or ports is between about 7620 cm (3000 in) and about 12,700 cm (5000 in), and the total area of the pressure venting port or ports is at least about 6.45 cm² (1 in²) per 100 g TNT equivalent of the potentially explosive materials to be contained.

8 Claims, 2 Drawing Figures

LABORATORY BARRICADE

BACKGROUND OF THE INVENTION

This invention relates to an improved barricade for use in protecting laboratory personnel and equipment from explosion hazards, and more particularly, to a lightweight structure, suitable for placement in a laboratory hood, which is designed to contain and vent the products of an accidental explosion while minimizing noise hazards.

Barricades are structures designed to prevent injury or damage from violent forces. Investigation of potentially explosive processes must be undertaken in a manner which reduces possible personnel injury and facility damage to a tolerable minimum. Traditionally, large and costly containment structures have been employed which were designed to house all parts of the potentially hazardous system, and which relied upon massive containment walls, remote sensing and control apparatus, and stringent safety procedures for their effectiveness.

Recent advances in miniaturization of test reactors and process systems have provided valuable savings in research and development costs. These microreactor systems employ milliliter quantities of reactants, concomitantly low energy inputs, small-scale conduits, pumps, mixing apparatus, and other specialized components. Refinements in instrumentation and analysis have permitted useful data to be obtained from microreactor systems, which can then be extrapolated to intermediate pilot plant and large scale production systems.

Despite the small scale of microreactor systems, a significant explosion hazard can be created depending upon the reaction or process being investigated. The magnitude of this potential explosion hazard may be expressed in terms of an equivalent force generated by an explosion of a given quantity of TNT (trinitrotoluene), or TNT equivalent (TNTE). On a scale relevant to the present invention, this potential hazard ranges between 0.3 and 100 g TNTE.

In order to realize the full cost and convenience advantages of microreactor technology, appropriately-scaled protective facilities are needed.

Large barricade and containment structure design has proceeded along two paths. The first approach opts for total containment of increased pressure, projected missiles, and noise resulting from an explosion. This "containment vessel" approach relies upon the configuration, massiveness, and strength of the vessel walls for its effectiveness. Experimentation undertaken in such a barricade must be carefully monitored to avoid exceeding strength limitations of the structure. One commercially available full containment vessel weighs approximately 1490 kg (4000 lbs.) and is designed to contain an explosive energy equivalent of 340.5 g (0.75 lb.) of TNT.

The second approach seeks to vent blast pressure and expanding gases of a contained explosion into the external environment of the barricade relatively instaneously. Certain designs retain only shrapnel or projectiles with mesh-like or net-like structures, permitting a pressure wave and expanding gas to escape the structure essentially unimpeded. Another variant of this approach employs "blowout ports" or vents, which may take the form of doors or aperture covers which are displaced by blast pressure, opening venting ports through which the expanding gases escape the containment vessel.

Since these "blowout port" systems vent explosion forces essentially instantaneously into the external environment, they are typically not located within conventional laboratory buildings. A blowout incident occurring in a conventional laboratory structure could be expected to result in personnel injury and facility damage due to shock and noise effects.

In regard to hazardous noise, the United States Occupational Safety and Health Administration (OSHA) has promulgated the following standard: "Exposure to impulsive or impact noise should not exceed 140 dB (decibels) peak sound pressure level." 29 C.F.R. 517 1910.95(a), (1981). For comparison purposes, Penninger and Okazaki, *Chem. Eng. Prog.*, 76:6, p. 65, report that 144 dB represents an average human threshold of pain, and that 157 dB can be expected to result in glass window damage.

The design of containment vessels and explosion venting systems has, to a large extent, proceeded on an empirical basis. For example, Loving, U.S. Pat. No. 3,165,916, discloses a noise-reducing structure and a formula for calculating static pressures in total containment vessels, which can be employed to assist in selecting materials and configurations for containment vessels.

According to Loving, the static pressure acting upon the walls of a containment structure during a contained explosion may be estimated by the formula $$P = K(W/V),$$

where P is static pressure (psi), K is a charge-dependent constant ($2 \times 10^4$ in the case of TNT), W is charge weight (lbs.), and V is containment structure volume ($ft^3$). The Loving formula predicts a static pressure of 11,405 kPa (1,654 psi) for a detonation of 100 g TNTE within a structure of volume 75,710 $cm^3$ (2.66 $ft^3$).

Penninger and Okazaki, *Chem. Eng. Prog.* 76:6 pp. 65-71, disclose a containment barricade constructed in accordance with the Loving formula, designed to contain the explosive effects of 0.907 kg TNTE. This design incorporates a baffled vent duct.

Weibull, *Ann. N.Y. Acad. Sci.*, v. 152 pp. 357-361, reports an empirically-derived formula for calculation of peak mean pressures in containment vessels. For contained TNT explosions within a charge weight/volume range of 0-5 $kg/m^3$, Weibull predicts a peak mean pressure $$p = 22.5 \, (Q/V)^{0.72},$$

where p is peak mean pressure in bars, Q is charge weight (kg), and V is chamber volume ($m^3$). Weibull's formula predicts a peak mean pressure of 2,731 kPa (396 psi) as a result of a detonation of 100 g TNTE in a chamber of volume 75,710 $cm^3$ (2.66 $ft^3$). Weibull tested chambers with vent openings, but concluded that the vent openings of the test chambers, which varied within a contained volume/vent area range of 5080 cm (2000 in) to 27,208 cm (10,909 in) had "no noticeable influence" upon the peak mean pressures measured.

SUMMARY OF THE INVENTION

The invention resides in an improved laboratory barricade for containment of potentially explosive materials and processes, having a containment chamber and a pressure venting port or ports, wherein the improvement comprises said barricade having dimensions such that a ratio of total contained volume to total area of the pressure venting port or ports is between about 7620 cm (3000 in) and about 12,700 cm (5000 in), and the total area of the pressure venting port or ports is at least about 6.45 cm$^2$ (1 in$^2$) per 100 g TNT equivalent of the potentially explosive materials to be contained.

DETAILED DESCRIPTION OF THE INVENTION

Figure 1:
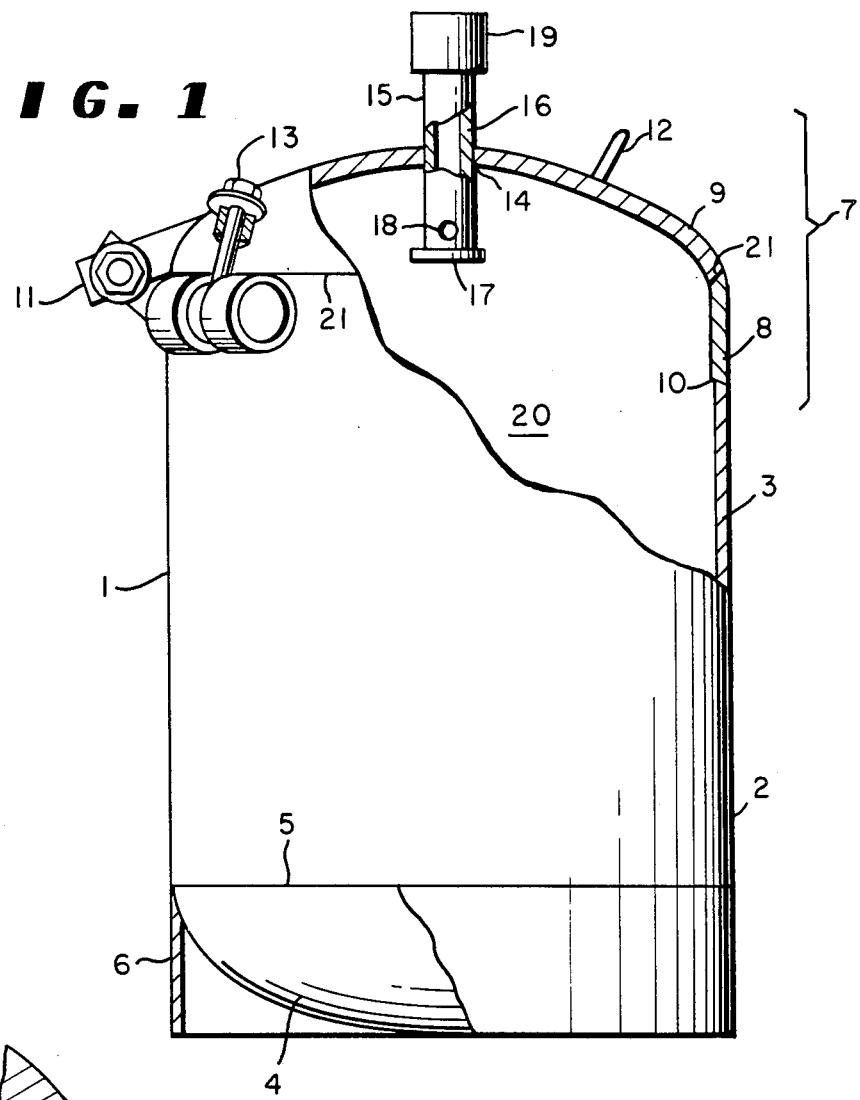
FIG. 1 is a cross-sectional view of a preferred embodiment of the improved laboratory barricade of the invention, with portions of the cylindrical wall structure broken away to disclose details of the interior of the barricade.

The accompanying FIG. 1 depicts a preferred barricade of the present invention in partial cross section. To expose internal structural details of the barricade, an upper right portion of the barricade has been broken away. Similarly, a lower left portion of the barricade has been broken away to disclose external details of the barricade.

Referring now to FIG. 1, a barricade chosen for purposes of illustration is generally denoted as 1. The barricade comprises a cylindrical steel containment chamber 2, which is fabricated from steel pipe section 3, here shown in partial cross section. The chamber further comprises a concave base member, or tank head 4, which has been welded along seam 5 to pipe section 3. Base support member 6 is shown welded or otherwise affixed to base member 4 for support of the resulting containment structure.

At the opposite end of the containment chamber 2, head closure assembly 7, comprising hub element 8 and head cover member 9, is shown welded to cylindrical pipe section 3 along upper bevel 10. A steel hinge assembly 11, which connects head cover member 9 to hub element 8 and thence to containment chamber 2, and a handle 12 for opening head cover 9, are also detailed in FIG. 1. Multiple-bolting closure assemblies 13, also of steel, are provided to secure head cover member 9 to hub element 8 during containment of potentially explosive materials or processes. Only one bolting closure assembly 13 is depicted in FIG. 1 for clarity of presentation.

At a selected position on head cover member 9, a hole 14 is provided to accept duct member 15, which can be fabricated from a section of carbon steel pipe. Duct member 15 further comprises pipe section 16, here depicted partially in cross-section, a rigid disc 17 welded to the end of duct member 15, and multiple pressure venting ports 18 bored at intervals along pipe section 16 between plate 17 and head cover member 9. A preferred method for attaching duct member 15 to head cover member 9 is by welding. Duct member 15 can be fitted with a connector member 19, which can be threaded to permit attachment of silencing or muffling means.

In operation, head cover member 9 is lifted away from containment chamber 2 by means of handle 12, pivoting by means of hinge assembly 11. A container or other system presenting a hazard of explosion, depicted by representation 20 in FIG. 1, is placed within the cylindrical containment chamber 2. Preferably, the system or container should not rest against the concave base member 4 or cylindrical pipe section 3 to minimize resonant noise effects. After placement in the chamber, head cover member 9 is closed and sealed to hub element 8, by means of a resilient gasket 21 affixed to annular fitting 22. A secure seal is effected by forcibly tightening head cover bolting closure assemblies 13. At this point, the external environment of the barricade is protected from the shock, missile, and noise hazards of the contained materials or processes.

Figure 2:
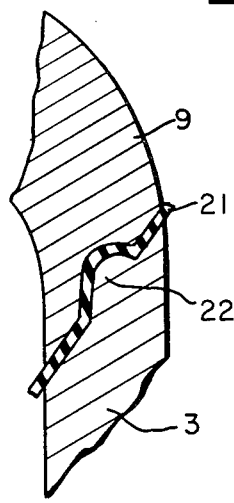
FIG. 2 illustrates, in cross-section, a particular region of the barricade shown in FIG. 1.

Referring now to FIG. 2, certain structural details of the barricade of FIG. 1 are depicted in cross-section. In particular, FIG. 2 illustrates the seal effected between concave head cover member 9, gasket 21, annular fitting 22, and steel pipe section 3.

Not shown in FIG. 1 or FIG. 2 are various small apertures which can be located in hub element 8. These apertures permit connection of electrical or fluid-transmitting conduits for operation and monitoring of hazardous experimental processes to be conducted within the barricade of the invention. A preferred method for connecting such conduits involves use of threaded connectors secured by nuts on the inside and outside of hub element 8. Provided that aperture diameter does not exceed 0.635 cm (0.25 in), missile containment, pressure venting, and noise attenuation functions of the invention are not affected to a significant extent.

Larger conduits can be run into containment chamber 2 through a sleeve section of steel pipe which is welded integrally to hub element 8. The internal diameter of the sleeve section should not exceed the outer diameter of the conduit by more than 0.32 cm (0.125 in).

Also not depicted in FIG. 1 or FIG. 2 are optional barricade internal structures designed to support containers, reactors, or other equipment to be placed within the barricade of the invention.

Although the containment chamber of the invention need not be of a cylindrical conformation capped by concave end members, it is preferred to minimize planar and angular inner surfaces in the construction of pressure vessels. This design advantageously reduces localized areas of acute stress produced by reflection of pressure waves resulting from a contained accidental explosion.

Suitable materials for fabricating barricade components include, in addition to steel, carbon steel, stainless steel, high-strength maraging steel and other steel alloys, aluminum and its alloys, or various composites of aluminum or steel and certain resin/fiber laminates known in the art of pressure vessel manufacture.

An alternative embodiment of the present invention can be fabricated in whole or in part of fiber composite materials. One example of such a material is polyamide fiber (poly(p-phenyleneterephthalamide)), such as that disclosed in U.S. Pat. No. 3,869,430, which is manufactured to achieve a modulus suitable for use in reinforcing plastic composites. A laminar construction can be laid up around suitably formed molds, and finished with an epoxy resin matrix. Several suitable resins are disclosed by Morris, E. E., "Kevlar Aramid Composites in Pressure Vessels/Tanks", in *Kevlar Composites,* Technology Conferences, El Segundo, Calif. (1980), p. 58.

In a particularly preferred embodiment, the outer end of the duct member is fitted with a threaded receptacle capable of joining a silencer or muffler unit. These units, known commercially as radial or lateral flow high pressure muffler units, can incorporate a secondary relief valve in case rated pressure tolerances of the unit are exceeded.

In an alternative preferred embodiment, an additional section of steel pipe, of a diameter equal to or greater than that of the duct member, can be secured to the outer end of the duct member. In this embodiment, noise and gases produced during a contained explosion are vented to the external environment of a structure in which the barricade is placed. In order to minimize resistance along this additional pipe section, no obstructions should be placed within the section.

The present invention represents an optimum balance between absolute containment and instantaneous venting of explosive overpressure. Thus, relationships between vessel volume, venting port area, and magnitude of potential explosion hazard are critical. With the present invention, hazardous noise and blast effects from detonations of measured quantities of explosive can be safely attenuated within a comparatively lightweight barricade having dimensions such that a ratio of total contained volume to total pressure venting port area is maintained in a range between about 7620 cm (3000 in) and about 12,700 cm (5000 in), for explosion hazards approximating 100 g TNTE per 6.54 cm$^2$ (1 in$^2$) venting port area. Moreover, explosive testing of barricades constructed in accordance with the present invention indicates that such barricades are capable of reducing explosive pressure build-up within the barricade by an order of magnitude from predicted values. At the same time, external noise effects, measured at a distance of 61 cm (24 in), were limited to levels in compliance with the aforementioned OSHA impulsive noise standard.

The advantages achieved by the present invention include not only low cost relative to alternative, large scale protective systems, but also light weight, ready access to the experimental systems by research personnel, and savings in time and convenience which are provided by locating test systems within conventional laboratory structures. For example, a laboratory barricade constructed in accordance with the present invention and tested with explosives ranging up to 100 g. TNT equivalent weighs less than about 75 kg (200 lbs.), and is sufficiently compact to permit placement within a conventional laboratory hood.

The following examples are given to further illustrate the present invention.

EXAMPLE 1

A laboratory barricade was constructed in accordance with the foregoing description of the preferred embodiment of the invention. The cylindrical body member employed was a section of ASA B36.10 Schedule 10 seamless carbon steel pipe, with a nominal outer diameter of 45.72 cm (18 in) and a wall thickness of 0.64 cm (0.25 in), giving an inner diameter of 44.45 cm (17.5 in). The section selected was approximately 26.7 cm (10.5 in) in length after cutting.

One annular surface of the cylindrical pipe section just described was beveled to accept a concave, or dished, carbon steel tank head, which is available to match seamless Schedule 10 pipe of the same outer diameter, wall thickness, and material grade. The tank head was joined to the beveled annular surface of the cylindrical body member by welding, forming an integral juncture of high strength.

In similar fashion, the opposite annular surface of the aforementioned pipe section was beveled to accept a suitable concave, or dished, hinged cover closure. In the art of pressure vessel manufacture, such cover closures are designated "autoclave heads". The head selected was fabricated by the manufacturer in two parts: first, a hub section with a bevel for attachment to a corresponding cylindrical section, and second, a dished head cover. The cylindrical hub and concave head parts were joined by a carbon steel hinge assembly. The resulting chamber was equipped with six bolting closures spaced equidistantly around the circumference of the head closure unit.

As in the case of the tank head, which in this example formed the concave base member of the completed barricade, the hub element of the head closure assembly was welded to the cylindrical pipe section along the matching bevels previously described. Like the tank head members, the head closure assemblies are available to match pipe sections of corresponding inner and outer diameters, wall thicknesses, material grades, and pressure and temperature tolerances. However, in the example herein described, the hinged head closure assembly selected had a wall thickness of 1.27 cm (0.5 in).

At the apex of the aforementioned head cover member, a hole was bored to accept, within close tolerances, an 18.73 cm (7.4 in) section of ASA 36.10 Schedule 40 carbon steel pipe, with an outer diameter of 4.83 cm (1.9 in), and an inner diameter of 4.09 cm (1.610 in.). This smaller pipe section was inserted through the hole bored at the apex of the head cover member such that a length of about 8.89 cm (3.5 in) projected beyond the inner surface of the head cover member. After this placement, the duct member and head cover member were welded together, forming an integral juncture.

At the end of the duct member below the apex of the head closure member, a disc of carbon steel, 7.62 cm (3.0 in) in diameter and 0.635 cm (0.25 in) thick, was welded to the annular end of the duct member. Four venting holes, each 1.59 cm (0.625 in) in diameter, were bored into the walls of the duct member between the disc and the juncture of the duct member with the inner surface of the head cover member. In this embodiment, the venting holes were spaced at equal intervals around the circumference of the duct member, approximately 1.91 cm (0.75 in) above the juncture of the disc and the lower annular surface of the duct member.

In addition, a ring-shaped base support member for the containment chamber was fabricated by cutting a 15.24 cm (6 in) long section of ASA B36.10 Schedule 10 seamless carbon steel pipe. This section was joined to the base of the completed containment chamber by welding.

The resulting dimensions of the closed containment chamber herein described were 45.72 cm (18 in) outer diameter, 44.45 cm (17.5 in) inner diameter, an overall length (including support ring base) of 68.58 cm (27 in), and a chamber length of approximately 61 cm (24 in). The resulting volume of this cylindrical chamber with concave ends was calculated to be about 75,710 cm$^3$ (4620 in$^3$). The total area of the four pressure venting ports, each 1.59 cm (0.625 in) in diameter, was 7.94 cm$^2$ (1.23 in$^2$), thereby affording a ratio of contained volume to pressure venting port area of 9536 cm (3756 in).

During actual testing of this barricade with explosive, the barricade was wrapped with layers of polyamide roving secured by wire bands. However, this relatively loose layer of protective material did not affect the missile containment, pressure venting, or noise attenuation characteristics of the barricade.

Explosive testing was carried out using pentaerythritol tetranitrate (PETN) as a substitute for TNT. As noted in Loving, U.S. Pat. No. 3,165,916, PETN has a higher available explosive energy than TNT (1300 kcal/g vs. 860 kcal/g). Thus, in calculating amounts of PETN to be employed in this and other explosive tests, approximately 0.56 g of PETN was employed to represent each equivalent gram of TNT.

No. 5 blast caps were employed to detonate the explosive, which, in certain tests, was inserted into a beaker of sand placed within the containment chamber. To simulate missiles which might be produced in an actual accidental laboratory explosion, a number of ordinary steel nuts and bolts ranging in size from 0.32 cm diameter by 0.32 cm (0.125 in) long to 1.27 cm (0.5 in) diameter by 5.08 cm (2 in) long were placed in the explosive.

Noise measurements were recorded with microphones placed at distances ranging from 30 cm (12 in) to 122 cm (48 in) from the containment chamber, and at a height of 135 cm (53 in) above ground level. All explosive tests were conducted within a roofless three-sided enclosure with concrete walls 305 cm (120 in) in height. During noise measurements, the barricade was placed in a position approximately 335 cm (132 in) from each of two of the walls of the enclosure, and 488 cm (192 in) from the third wall. Microphones were placed at the aforementioned distances from the barricade along a line extending from the barricade directly towards an open side of the test enclosure.

The aforementioned barricade was tested in two general configurations: first, as a preferred embodiment previously described and second, as a particularly preferred embodiment which incorporates a silencing or muffling means attached to the distal portion of the vent duct member.

During explosive testing of the barricade of this example, several types of muffling or silencing means were evaluated. For convenience of reference, these muffler types are designated by letters "A" through "D" in Table 1, below. The various mufflers corresponding to these designations are described below:

Muffler Types:
A: Approximately 20.3 cm (8 in) of additional duct pipe, containing 241 cm (95 in) 2/0 link chain in a coiled configuration, was attached to the distal portion of the barricade vent duct member.
B: Approximately 20.3 cm (8 in) of additional duct pipe, containing 110.5 cm 2/0 steel chain and 351 cm (138 in) bronze sash chain in a coiled configuration, was attached to the distal portion of the barricade vent duct member.
C: Approximately 40.6 cm (16 in) of additional duct pipe, containing 241 cm (95 in) 2/0 steel chain and 351 cm (138 in) bronze sash chain in a coiled configuration, was attached to the distal portion of the barricade vent duct member.
D: An additional section of duct pipe, 305 cm (120 in) in length, was attached to the distal portion of the barricade vent duct member.

In general, no significant damage was sustained by the barricade as a result of testing with amounts of explosive ranging from 16.0 to 100 g TNTE. No missile penetrated the vessel walls, although some gouging of interior surfaces was apparent. Approximately coincident with each test explosion, a plume of sand particles was expelled from the vent duct of the test barricade over a period of about 1 to 2 seconds, indicating that internal pressure within the barricade was dissipated in a gradual, rather than instantaneous, manner.

Noise measurements obtained during explosive testing of the 18" barricade are presented in the following table:

TABLE 1

Noise Measurements Obtained During Explosive Testing of 18" × 24" Laboratory Barricade

| Test | Muffler Type | Explosive PETN (g) | TNTE (g) | Sound Pressure Level: (dB) Microphone Distance from Barricade: (cm) | | | | Notes |
|---|---|---|---|---|---|---|---|---|
| | | | | 30.5 | 61 | 122 | 244 | |
| 2 | None | * | * | 156 | 148 | 138 | NR | 1,2 |
| 3 | None | * | * | 156 | 149.6 | 142.2 | 136 | 2 |
| 5 | None | * | * | 156 | 148.6 | 139.2 | 132 | 2 |
| 7 | None | 9.0 | 16.0 | 160 | 162.0 | 153.5 | 140 | |
| 8 | None | 9.0 | 16.0 | 167 | 158.0 | 150.6 | 142 | |
| 9 | None | 25.0 | 45.0 | 170 | 163.0 | 156.6 | 150 | |
| 10 | A | 9.0 | 16.0 | NR | 137.6 | 135.2 | 130 | |
| 11 | B | 9.0 | 16.0 | 139 | 137.6 | 132.4 | 128 | |
| 12 | C | 25.0 | 45.0 | 145 | 140.4 | 133.4 | 130 | |
| 13 | None | 9.0 | 16.0 | 150 | 140.5 | 135.4 | 130 | 3 |
| 14 | D | 55.5 | 100.0 | 142 | 140 | 139.6 | NR | 3 |

Notes:
1 NR indicates that no measurement was obtained.
2 Noise measurements indicated are the result of a detonation of two No. 5 blasting caps only.
3 For these tests, the explosive was placed in a sand bath.

EXAMPLE 2

A second laboratory barricade was constructed in accordance with the foregoing description of the preferred embodiment of the invention and in similar fashion to the barricade described in Example 1, except that the following barricade dimensions were selected:
Containment chamber outer diameter: 35.6 cm (14 in)
Containment chamber length: 66.0 cm (26 in)
Vent duct member outer diameter: 2.5 cm (1 in)
Vent duct member overall length: 12.7 cm (5 in)
Pressure venting port diameter: 1.3 cm (0.5 in)

The total contained volume of the barricade of this example was calculated to be approximately 39,980 cm$^3$ (2440 in$^3$). The total area of the four pressure venting ports was 5.06 cm$^2$ (0.79 in$^2$), resulting in a ratio of total contained volume to total venting port area of 7901 cm (3110 in).

This second barricade was also tested for noise attenuation characteristics by detonation of contained quantities of explosive. As in the case of the barricade described in Example 1, this barricade was tested with a muffler or silencer attached, which is designated by the letter "E" in Table 2, below. Muffler type "E" consisted of a 22.9 cm (9 in) length of carbon steel pipe, 2.54 cm (1 in) in outer diameter, containing a 193 cm (76 in) section of bronze sash chain in a coiled configuration, attached to the distal end of the vent duct member.

As in the case of the barricade of Example 1, explosive testing ranging up to 45 g TNTE resulted in no significant damage to the containment chamber of the barricade. The following table represents the results of the noise measurement tests:

TABLE 2

Noise Measurements Obtained During Explosive Testing of 14" × 26" Laboratory Barricade

| Test | Muffler Type | Explosive PETN (g) | Explosive TNTE (g) | Sound Pressure Microphone Distance from Barricade: (cm) 30.5 | 61 | 122 | 244 | Notes |
|---|---|---|---|---|---|---|---|---|
| 16 | None | 9.0 | 16.0 | 146 | 136.6 | 129 | NR | 1 |
| 17 | E | 25.0 | 45.0 | 148 | 137.6 | 134 | NR | 1 |

Notes:
1 NR indicates that no measurement was obtained.

BEST MODE

The best mode contemplated by the inventors for practicing their invention is illustrated by FIG. 1.

INDUSTRIAL APPLICABILITY

The invention has utility in protecting persons and facilities from effects of accidental explosions during conduct of potentially hazardous processes and experiments.

The foregoing disclosure illustrates particular embodiments of the invention. However, the invention is not limited to the precise construction herein disclosed but rather encompasses all modifications or embodiments thereof within the scope of the following claims.

What is claimed is:

1. An improved barricade for containment of potentially explosive materials and processes, having a containment chamber in which said materials are placed or said processes run, said chamber being provided with a pressure venting port or ports, wherein the improvement comprises said barricade having dimensions such that a ratio of total contained volume to total area of the pressure venting port or ports is between about 7620 cm and about 12,700 cm, wherein the total area of the pressure venting port or ports is at least about 6.45 cm$^2$ per 100 g TNT equivalent of the potentially explosive materials or processes to be contained, and wherein the total contained volume is between about 8200 cm$^3$ and about 98,300 cm$^3$.

2. The barricade of claim 1 wherein each pressure venting port has an area of 6.45 cm$^2$ or less.

3. A method of containment of potentially hazardous materials or processes which comprises enclosing the potentially hazardous material or process within the barricade of claim 1.

4. A barricade for containment of potentially explosive materials and processes, having a containment chamber in which said materials are placed or said processes run, wherein the containment chamber comprises a rigidly-walled cylinder with an upper and a lower annular surface, a concave base member secured integrally to the lower annular surface of said cylinder, a concave head cover member movably attached to the upper annular surface of said cylinder, means for effecting a pressure seal between the upper annular surface of the cylinder and the head cover member, a duct member secured integrally to the head cover member at a sealed juncture and extending therethrough, one end of said duct member being located within the containment chamber when the head cover is secured in sealed relation to said cylinder, and one end of said duct member being located without the containment chamber, a rigid disc secured integrally to the end of the duct member located within the containment chamber, and a pressure venting port or ports located along the duct member between the disc and the juncture of the duct member and the head cover member;

wherein said barricade has dimensions such that a ratio of total contained volume to total area of the pressure venting port or ports is between about 7620 cm and about 12,700 cm, and the total area of the pressure venting port or ports is at least about 6.45 cm$^2$ per 100 g TNT equivalent of the potentially explosive materials or processes to be contained, and each pressure venting port has an area of 6.45 cm$^2$ or less.

5. The barricade of claim 4 wherein the means for forcibly securing the head cover member to the upper annular surface of the cylinder are hydraulically assisted.

6. The barricade of claim 4 wherein the containment chamber is fabricated from fiber composite materials.

7. The barricade of claim 4 wherein the end of the duct member located outside the containment chamber is provided with means for silencing noise produced during a contained explosion.

8. The barricade of claim 4 wherein an additional section of duct pipe is secured to the end of the duct member located outside the containment chamber, said additional section being of a length sufficient to vent noise produced during a contained explosion to a region outside a laboratory building in which said barricade is placed.

* * * * *